(12) United States Patent
Berti et al.

(10) Patent No.: US 11,313,618 B2
(45) Date of Patent: Apr. 26, 2022

(54) INTEGRATED EXPANDER-MOTOR COMPRESSOR

(71) Applicant: Nuovo Pignone Tecnologie Srl, Florence (IT)

(72) Inventors: Matteo Berti, Florence (IT); Giuseppe Sassanelli, Florence (IT); Giuseppe Iurisci, Florence (IT); Thomas Alban, Chatenoy le Royal (FR)

(73) Assignee: NUOVO PIGNONE TECNOLOGIE SRL, Florence (IT)

( * ) Notice: Subject to any disclaimer, the term of this patent is extended or adjusted under 35 U.S.C. 154(b) by 0 days.

(21) Appl. No.: 16/077,354

(22) PCT Filed: Mar. 7, 2017

(86) PCT No.: PCT/EP2017/055290
§ 371 (c)(1),
(2) Date: Aug. 10, 2018

(87) PCT Pub. No.: WO2017/153387
PCT Pub. Date: Sep. 14, 2017

(65) Prior Publication Data
US 2019/0041124 A1   Feb. 7, 2019

(30) Foreign Application Priority Data

Mar. 9, 2016   (IT) .................. 102016000024897

(51) Int. Cl.
*F25B 1/04*    (2006.01)
*F25J 1/00*    (2006.01)
(Continued)

(52) U.S. Cl.
CPC .......... *F25J 1/0022* (2013.01); *F01D 15/005* (2013.01); *F01D 25/16* (2013.01); *F01D 25/183* (2013.01);
(Continued)

(58) Field of Classification Search
CPC .... F25B 9/06; F25B 9/00; F25B 11/00; F25B 11/02; F25B 11/04; F25B 2309/004;
(Continued)

(56) References Cited

U.S. PATENT DOCUMENTS 3,397,138 A     8/1968  Bacon
3,792,590 A  *  2/1974  Lofredo ............... F25J 1/0022
                                                    62/614
(Continued)

FOREIGN PATENT DOCUMENTS

CN   203323445 U   12/2013
CN   203880993 U   10/2014
(Continued)

OTHER PUBLICATIONS

JP2005098604 translation (Year: 2005).*
(Continued)

*Primary Examiner* — Brian M King
(74) *Attorney, Agent, or Firm* — Baker Hughes Patent Org.

(57) ABSTRACT

An expander and motor-compressor unit is disclosed. The unit includes a casing and an electric motor arranged in the casing. A compressor is arranged in the casing and drivingly coupled to the electric motor through a central shaft. Furthermore, a turbo-expander is arranged for rotation in the casing and is drivingly coupled to the electric motor and to the compressor through the central shaft.

15 Claims, 6 Drawing Sheets

(51) Int. Cl.
| | |
|---|---|
| *F01D 15/00* | (2006.01) |
| *F01D 25/16* | (2006.01) |
| *F04D 25/02* | (2006.01) |
| *F02C 1/02* | (2006.01) |
| *F25J 3/06* | (2006.01) |
| *F25J 1/02* | (2006.01) |
| *F25J 3/04* | (2006.01) |
| *F02C 7/06* | (2006.01) |
| *F25B 1/10* | (2006.01) |
| *F25B 11/04* | (2006.01) |
| *F25B 31/02* | (2006.01) |
| *F04D 25/06* | (2006.01) |
| *F04D 29/058* | (2006.01) |
| *F04D 29/58* | (2006.01) |
| *F01D 25/18* | (2006.01) |
| *F04D 29/70* | (2006.01) |
| *F25B 31/00* | (2006.01) |

(52) U.S. Cl.
CPC ............... *F02C 1/02* (2013.01); *F02C 7/06* (2013.01); *F04D 25/024* (2013.01); *F04D 25/06* (2013.01); *F04D 29/058* (2013.01); *F04D 29/584* (2013.01); *F04D 29/5806* (2013.01); *F04D 29/706* (2013.01); *F25B 1/04* (2013.01); *F25B 1/10* (2013.01); *F25B 11/04* (2013.01); *F25B 31/026* (2013.01); *F25J 1/005* (2013.01); *F25J 1/0035* (2013.01); *F25J 1/0257* (2013.01); *F25J 1/0279* (2013.01); *F25J 1/0288* (2013.01); *F25J 3/04381* (2013.01); *F25J 3/061* (2013.01); *F25J 3/064* (2013.01); *F25J 3/0635* (2013.01); *F25J 3/0695* (2013.01); *F25B 31/006* (2013.01); *F25B 2400/13* (2013.01); *F25B 2400/14* (2013.01); *F25B 2400/23* (2013.01); *F25B 2500/18* (2013.01); *F25J 2220/64* (2013.01); *F25J 2230/20* (2013.01); *F25J 2230/30* (2013.01); *F25J 2230/32* (2013.01); *F25J 2240/02* (2013.01); *F25J 2270/04* (2013.01); *F25J 2270/14* (2013.01)

(58) Field of Classification Search
CPC .. F25B 2309/005; F25J 1/0279; F25J 1/0281; F25J 1/0285
See application file for complete search history.

(56) References Cited

U.S. PATENT DOCUMENTS

| | | | |
|---|---|---|---|
| 2007/0101755 A1* | 5/2007 | Kikuchi | F04D 29/058 62/402 |
| 2009/0113928 A1* | 5/2009 | Vandor | F25J 1/0022 62/612 |
| 2010/0186445 A1* | 7/2010 | Minta | F25J 1/0042 62/606 |
| 2013/0091869 A1* | 4/2013 | Bardon | F01D 15/005 62/6 |
| 2016/0265545 A1* | 9/2016 | Ueda | F25B 9/002 |

FOREIGN PATENT DOCUMENTS

| | | |
|---|---|---|
| DE | 102006039889 A1 | 2/2008 |
| GB | 1 280 640 A | 7/1972 |
| JP | 2005-098604 A | 4/2005 |
| WO | 2015/032510 A1 | 3/2015 |

OTHER PUBLICATIONS

Reuter, K., "Integrated machinery systems for cryogenic processes consisting of turboexpander, compressor, high-frequency motor and generator with magnetic bearings," IEE Colloquium on High Speed Bearings for Electrical Machines, pp. 6/1-6/12 (Apr. 25-25, 1995).
Search Report and Written Opinion issued in connection with corresponding IT Application No. 102016000024897 dated Nov. 21, 2016.
International Search Report and Written Opinion issued in connection with corresponding PCT Application No. PCT/EP2017/055290 dated Jul. 6, 2017.
International Preliminary Report on Patentability issued in connection with corresponding PCT Application No. PCT/EP2017/055290 dated Sep. 11, 2018.

\* cited by examiner

INTEGRATED EXPANDER-MOTOR COMPRESSOR

FIELD OF THE INVENTION

The present disclosure relates to gas processing. Some embodiments disclosed herein concern motor-compressors for processing hydrocarbon gas, possibly containing components having a high molecular weight which can condense and generate a liquid phase in the gaseous stream.

BACKGROUND OF THE INVENTION

Motor-compressor units are widely used in the field of oil and gas, e.g. for boosting the pressure of natural gas. Motor-compressors usually include an electric motor drivingly coupled to a compressor, in particular a centrifugal compressor. Integrated motor-compressor units are known, wherein both the electric motor and the compressor are housed in a sealingly closed casing. The motor is housed in a motor compartment and the compressor is housed in a compressor compartment. The rotor of the electric motor and the rotor of the compressor are mounted on a common shaft, which is supported for rotation in the casing. Gas enters the compressor at a suction side and is delivered by the compressor at a delivery side, at a delivery pressure, higher than the suction pressure. In some applications motor-compressors are designed for boosting the pressure of natural gas from a gas field or well and delivering the natural gas to a natural gas liquefaction plant (LNG plant), or in some cases directly into a gas distribution network.

The natural gas is usually a mixture comprised of several hydrocarbons of different molecular weight. Hydrocarbons having higher molecular weight may condense and give raise to a liquid phase. Also, water can be contained in the gas flow. In some applications, these components having a heavier molecular weight, as well as water shall be removed prior to delivering the natural gas to a network or piping. In some known arrangements, the natural gas from the gas well is caused to flow through a lamination valve. The pressure and temperature drop across the lamination valve causes the heavier hydrocarbons and possibly water contained in the gas to condense, and the liquid phase can be removed from the gas stream in a liquid removal device. This is applied for example for controlling the dew point of the gas. The pressure of the laminated and cleaned gas must then be boosted again to a requested delivery pressure. Motor-compressors are usually used to boost the gas pressure from the low pressure after lamination to the requested delivery pressure. The dew point control thus involves a power expenditure, since the pressure drop in the lamination valve must be recovered by the compressor at the expense of energy power delivered to the electric motor.

Integral expander-compressor units have been developed, wherein the gas is expanded in a turbo-expander and the power generated by the gas expansion is at least partly recovered as compression work by the compressor. Mechanical coupling between the expander and the compressor is provided by a common shaft.

These devices of the current art have several drawbacks and limitations, among which the need for an additional compressor train, since the power generated by the expander is not sufficient for achieving the required delivery pressure. Moreover, gas migration from the expander to the compressor compartment can occur, since the gas pressure in the expander is higher than the gas pressure in the compressor side. Migration causes contamination of the gas processed by the compressor.

A need therefore exists for a more efficient way of controlling the dew-point of a process gas and a more efficient compression system.

SUMMARY OF THE INVENTION

According to a first aspect, disclosed herein is an expander and motor-compressor unit comprising a casing wherein an electric motor and a compressor are arranged. The compressor is drivingly coupled to the electric motor through a central shaft. Furthermore, a turbo-expander is arranged for rotation in the casing and is drivingly coupled to the electric motor and to the compressor through the central shaft.

According to some modes of operation of the expander and motor-compressor unit, a process gas is first expanded in the turbo-expander and subsequently compressed again in the compressor. The gas pressure drop caused by the expansion provokes also a temperature drop, i.e. cooling of the gas. Gas cooling can cause the heavier gas components, having a higher dew point temperature, to condense, such that they can be removed in a liquid removal arrangement, prior to compression of the process gas in the compressor. Mechanical power generated by the turbo-expander is recovered through the central shaft, and used to drive the compressor. Since the power generated by gas expansion in the turbo-expander is usually insufficient to achieve the required gas delivery pressure, the electric motor delivers additional power to the central shaft. Under some operating conditions, though, the power provided by the expander may be sufficient to drive the compressor or even higher than the power required by the compressor. In such situations, the electric motor can switch to a generator mode and convert the available mechanical power in excess into electric power, which can be delivered to the electric power distribution grid or to a user.

The three rotary machines, i.e. the turbo-expander, the electric motor and the compressor are housed in one and the same casing, which can be sealingly closed, thus forming an integrated expander and motor-compressor. The central shaft can be integrally supported inside the casing, and sealingly housed therein such that no rotary seals are required on the rotating shaft.

The central shaft can be a single shaft component. In some embodiments, the central shaft can be comprised of two or more shaft sections, connected to one another by suitable joints, for instance elastic joints.

In embodiments disclosed herein the compressor is a centrifugal compressor. More specifically, embodiments are disclosed, comprising a multi-stage centrifugal compressor. The compressor rotor is usually supported in-between bearings, i.e. the central shaft is supported by respective bearings at both sides of the compressor rotor. In embodiments, the central shaft is supported by at least three bearings, one or more whereof can have a radial supporting capability, an axial supporting capability, or both a radial and an axial supporting capability. In other embodiments, in particular if a central shaft comprised of two or more sections connected to one another by intermediate joints, more than three bearings can be provided.

Gas delivery paths can be provided to deliver cooling gas and/or buffering gas from the compressor to other components of the expander and motor-compressor unit. In some embodiments, gas from the compressor is delivered to the electric motor and/or to one or more active magnetic bearings supporting the central shaft, for cooling purposes.

While one of the primary uses of the expander and motor-compressor unit according to the present disclosure is for dew point control, the machine described herein can be employed in a variety of different configurations, wherein the process gas is sequentially processed in the expander and in the compressor, or vice-versa, in an open circuit or in a closed circuit. Some possible configurations will be described in more detail herein after. Processing of different gas flows, e.g. gases having a different chemical composition, in the expander and in the compressor are not excluded.

According to a further aspect, the disclosure relates to methods of processing a gas are disclosed herein, comprising:

expanding a gas flow in a turbo-expander mounted on a central shaft, and producing mechanical power therewith; the turbo-expander and the central shaft mounted for rotation in a casing;

compressing a gas flow through a compressor arranged in the casing and drivingly coupled through the central shaft to the turbo-expander and to an electric motor housed in the casing, such that the compressor is driven by the turbo-expander and the electric motor.

The gas flow through the turbo-expander can be the same gas flow processed through the expander, or a portion thereof. Or else, the gas flow processed through the expander can be a portion of the gas flow through the compressor. In other embodiments, the same gas flows through the turbo-expander and through the compressor. The gas can flow through an open circuit or a closed circuit. The gas flow can be from the compressor to the turbo-expander or vice-versa.

According to some embodiments, the method comprises:

expanding a gas from a first pressure to a second pressure, and reducing temperature thereof, in a turbo-expander mounted on a central shaft, an producing mechanical power thereby; the turbo-expander and the central shaft mounted for rotation in a casing;

delivering the expanded gas, to a compressor and compressing the expanded gas with the compressor from the second pressure to a third pressure; the compressor arranged in the casing and drivingly coupled through the central shaft to the turbo-expander and to an electric motor housed in the casing, such that the compressor is driven by the turbo-expander and the electric motor.

According to some embodiments, the method can further include the step of removing a liquid phase from the expanded gas. The liquid phase can be formed by condensation of steam or other components of the gas For instance, if the gas is comprised of a mixture of hydrocarbons, the liquid phase may be at least partly formed by condensed heavier hydrocarbons, i.e. hydrocarbons having a heavier molecular weight.

According to some embodiments, the method can comprise the further step of extracting a side stream of at least partly compressed gas from the compressor and delivering the side stream to a sealing arrangement, which separates a first casing compartment from a second casing compartment, the turbo-expander being arranged in the first casing compartment and the electric motor being arranged in the second casing compartment. Some embodiments of the method disclosed herein can further include the step of extracting a cooling gas stream from the compressor and cooling the electric motor with said cooling gas stream.

A further step of extracting a cooling gas stream from the compressor can be provided. The cooling gas can be used to cool at least one active magnetic bearing supporting said central shaft with said cooling gas stream. The cooling gas can be returned from the electric motor back to the compressor.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of embodiments of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. Embodiments of the invention are capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of embodiments of the present invention. It is important, therefore, that the claims be regarded as including such equivalent constructions insofar as they do not depart from the spirit and scope of embodiments of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION

Figure 1:
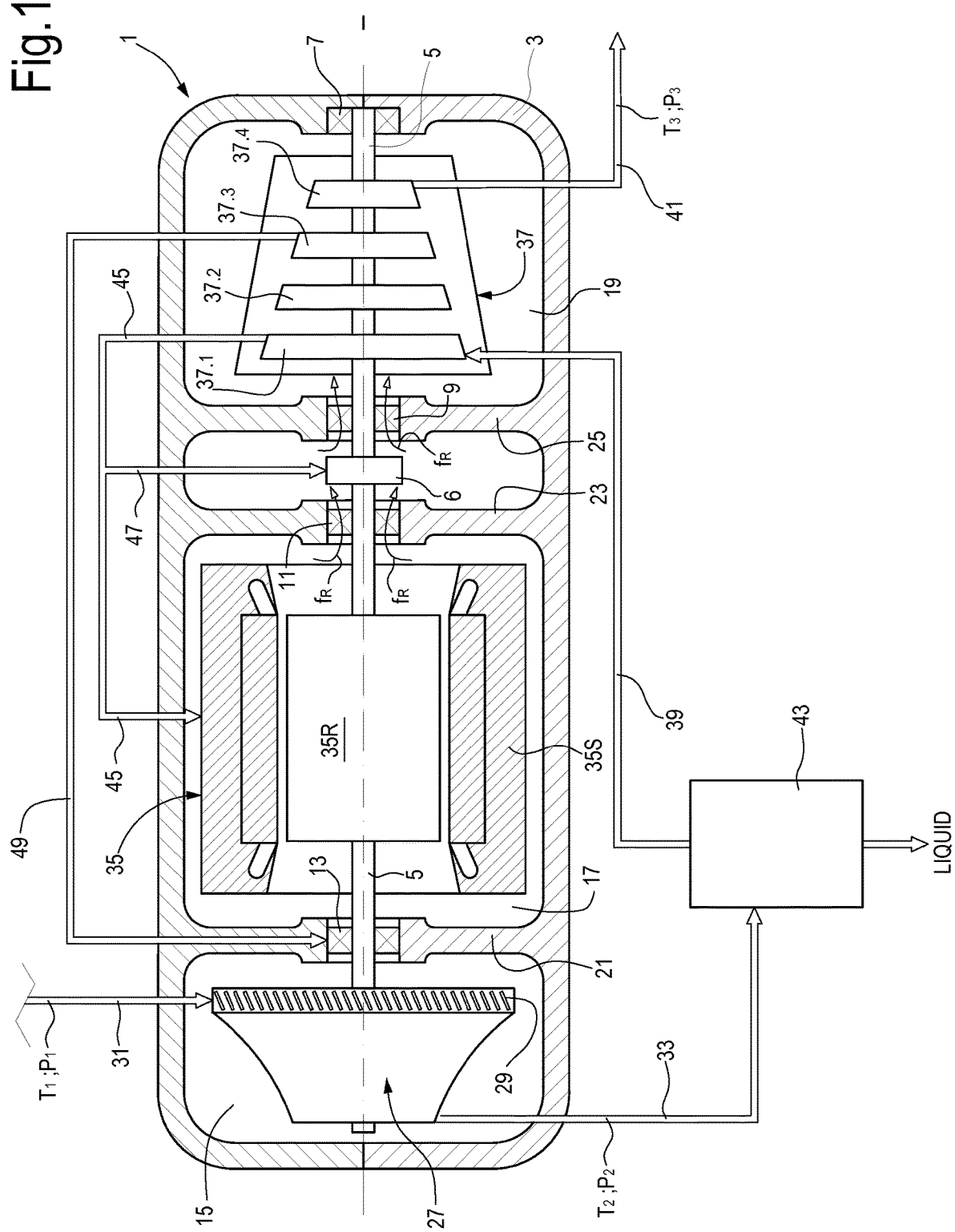
FIG. 1 illustrates a schematic of an expander and motor-compressor unit according to a first embodiment.

The following detailed description of the exemplary embodiments refers to the accompanying drawings. The same reference numbers in different drawings identify the same or similar elements. Additionally, the drawings are not necessarily drawn to scale. Also, the following detailed description does not limit embodiments of the invention. Instead, the scope of embodiments of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Reference number 1 designates an integrated expander and motor-compressor unit comprised of a casing 3. A central shaft 5 is supported for rotation in the casing 3. According to some embodiments, the central shaft 5 is supported by a plurality of bearings 7, 9, 11, 13, some or all of which can include active magnetic bearings. The bearings can include radial bearings and at least one axial bearing. The axial bearing can be arranged at 7. The central shaft 5 can be comprised of two or more shaft portions. In the exemplary embodiment of FIG. 1 the central shaft 5 is comprised of two portions, which are drivingly coupled by a joint 4, e.g. an elastic joint.

The casing 3 can be divided into a first casing compartment 15, a second casing compartment 17 and a third casing compartment 19. A partition wall 21 separates the first casing compartment 15 from the second casing compartment 17. A further partition wall or a pair of partition walls 23, 25 separate the second casing compartment 17 from the third compartment 19. The bearings 9, 11 and 13 can be located in or at the partition walls and can be combined with sealing means, not shown, through which the central shaft 5 extends.

According to the embodiment shown in FIG. 1 a turbo-expander 27, for example a centripetal turbo-expander is arranged in the first casing compartment 15. The rotor of the turbo-expander 27 is mounted on the central shaft 5 for co-rotation therewith. In some embodiments the turbo-expander 27 is mounted in an overhung configuration, i.e. on a portion of the central shaft 5, which projects from the bearing 13. In some embodiments, the turbo-expander 27 is provided with variable inlet guide vanes (IGVs) schematically shown at 29. Reference numbers 31 and 33 indicate the turbo-expander inlet and the turbo-expander outlet, respectively. Process gas at a first pressure P1 and first temperature T1 enters the turbo-expander 27 through the variable inlet guide vanes 29 at the inlet 31 and is discharged at the outlet 33 at a second pressure P2 and second temperature T2, lower than the first pressure T1 and first temperature T1.

In the exemplary embodiment of FIG. 1 the turbo-expander 27 is a single-stage turbo-expander, having a single wheel or rotor, mounted for co-rotation on shaft 5. In other embodiments, not shown, a turbo-expander comprised of a plurality of stages can be used instead.

An electric motor 35 is arranged in the second casing compartment 17. The electric motor 35 is mounted in an in-between bearings fashion, between bearings 13 and 11. The rotor 35R of the electric motor 35 is mounted on the central shaft for co-rotation therewith, while the stator 35S of the electric motor 35 is stationarily mounted in the casing 3.

A compressor 37, more particularly, a multi-stage compressor, such as a centrifugal multi-stage compressor is arranged in the third compartment 19 of the casing 3 and can be mounted in an in-between bearing configuration between bearings 7 and 9. The compressor 37 can be comprised of a plurality of compressor stages schematically shown at 37.1, 37.2, 37.3, 37.4. While in the embodiment of FIG. 1 the compressor 37 is comprised of four compressor stages, those skilled in the art will understand that a different number of compressor stages can be provided, e.g. depending upon the final pressure, which the gas processed by compressor 37 must reach. Each compressor stage 37.1-37.4 comprises an impeller and a diffuser. The impellers form a compressor rotor mounted on the central shaft 5 for co-rotation therewith. Reference numbers 39 and 41 schematically designate the compressor inlet and the compressor outlet, i.e. the suction side and the delivery side of compressor 37. Thus, the compressor 37 is drivingly coupled through shaft 5 to the turbo-expander 27 and to the electric motor 35.

The multi-stage centrifugal compressor rotor is supported in-between bearings 7, 9.

In some embodiments the turbo-expander outlet 33 can be fluidly coupled to a liquid removal arrangement 43, which is in turn fluidly coupled to the suction side 39 of compressor 37.

According to some embodiments, a gas path 45 can be provided, which extends from one of the compressor stages 37.1-37.4 to the second casing compartment 17, wherein the electric motor 35 is housed. The inlet of the gas path 45 can be fluidly coupled with the delivery side of the first or second compressor stage 37.1, 37.2, for example. A further gas path 47 can branch-off from the gas path 45 and be fluidly coupled with the bearings 9, 11, which are located between the electric motor 35 and the compressor 37. Partially compressed process gas can thus be delivered to the electric motor 35 and to the bearings 9, 11 for cooling purposes.

A further gas path 49 can provide a fluid connection between one of the most downstream compressor stages, e.g. the third compressor stage 37.3, and the partition wall 21. Buffering gas can thus be delivered by the compressor 37 to the sealing arrangement positioned around the central shaft 5, between the first casing compartment 15 and the second casing compartment 17.

The operation of the integrated turbo-expander and motor-compressor unit 1 described so far is the following. Process gas, e.g. natural gas from a gas well or gas field at a first pressure P1 and first temperature T1 enters the turbo-expander 27 through the variable IGVs 29 and is at least partly expanded therein. The gas at the outlet 33 of the turbo-expander 27 achieves a pressure P2 and a temperature T2. Due to the expansion process in the turbo-expander 27, the pressure P2 is lower than the pressure P1 and the temperature T2 is lower than the temperature T1. Mechanical power is generated by the enthalpy drop between the inlet 31 and the outlet 33 of the turbo-expander 27. Mechanical power generated by the enthalpy drop is available on the central mechanical shaft 5 and is used to rotate the compressor 19.

The temperature T2 achieved at the outlet of the turbo-expander 27 can be below 0° C. The temperature drop causes condensation of the heavier gas components and possibly water, and is used to control the exit temperature of the gas processed through the integrated turbo-expander and motor-compressor 1 and delivered at the delivery side 41 of the compressor 37.

In some embodiments, the liquid phase formed by condensation can be removed from the main gaseous stream in the liquid separation arrangement 43, through which the process gas delivered by the turbo-expander 27 flows prior to enter the compressor 37.

In other embodiments, gas expansion in the expander can be used to reduce the gas temperature for purposes different than dew point control and liquid phase removal.

Clean gas is usually thus available at the suction side of the compressor 37. This latter boosts the pressure of the process gas from pressure P2 to a pressure P3 at the delivery side 41 of the compressor 37. Usually the pressure P3 is higher than the starting pressure P1 at which the process gas enters the turbo-expander 27. A flow of partly compressed, clean gas is extracted from the first or an intermediate stage of compressor 37 through the gas path 45 and delivered to the second casing compartment 17 to cool the electric motor 35. Since the gas processed by compressor 37 has been usually cleaned in the liquid removal arrangement 43, the flow of partly compressed gas delivered through path 45 can enter the second casing compartment 17 without requiring additional filtering or cleaning. A gas return path can be provided through the partition walls 23, 25, as schematically shown by arrows fR, such that the gas used for motor cooling returns in the main gas flow processed by the compressor 37. Since the pressure required for cooling the electric motor shall be sufficient just for returning the gas in the main path towards the inlet of the first compressor stage 37.1, low-pressure gas from the outlet of the first compressor stage 37.1, or else from the second compressor stage 37.2 can be used for motor cooling, which reduces the amount of power spent to circulate the cooling gas in the second casing compartment 17.

The gas flowing along the return path can at least partly cool the active magnetic bearings 9, 11. If additional or cooler gas is needed for cooling the bearings, cold, clean and partly compressed gas can be delivered through the branching off path 47 directly to the bearings 9, 11, which additional gas is then returned to the compressor 37.

An additional side stream of clean gas, at a pressure higher than the pressure in gas path 45, is taken from one of the more downstream stages of compressor 37, and is used as buffering gas in the area between the first casing compartment 15 and the second casing compartment 17. The buffering gas flowing through gas path 47 shall have a pressure sufficient to prevent leakages of wet gas from the first casing compartment 15 to the second casing compartment 17. Thus, the clean gas in the gas path 47 can be at a pressure higher than the pressure P1 at the inlet side of the turbo-expander 27. In other embodiments, the buffering pressure can be at a pressure higher than P2 but lower than P1. The buffering gas can also be used to cool active magnetic bearing 13

The combined turbo-expander and motor-compressor unit 1 described above allows substantial energy saving in combination with dew point control promoted by the turbo-expander. The enthalpy drop through the turbo-expander causes cooling of the gas at the desired lower temperature for dew point control purposes, while the mechanical coupling of the turbo-expander 27 and the compressor 37 allows recovery of the mechanical power generated by the turbo-expander. Said power is used, in combination with additional power generated by the electric motor 35, to drive the compressor 37 and boost the pressure of the gas at the required final pressure P3.

All the rotary machines, i.e. the turbo-expander 27, the electric motor 35 and the compressor 37 are housed in a sealed casing 1, such that leakages of process gas along the central shaft 5 are avoided. The electric motor 35 and any active magnetic bearing present in the combined turbo-expander and motor-compressor can be cooled by the same process gas after removal of the liquid fraction in the liquid removal arrangement 43. The same process gas can be used as a buffering as for preventing leakages of wet gas in the electric motor compartment 17 and back in the compressor 37. Buffering can be performed entirely inside the sealed casing 1 and no filtering is needed.

The variable nozzle guide vanes 29 can be used to control the exit temperature T2 and match the speed variations set by the compressor 37.

Figure 2:
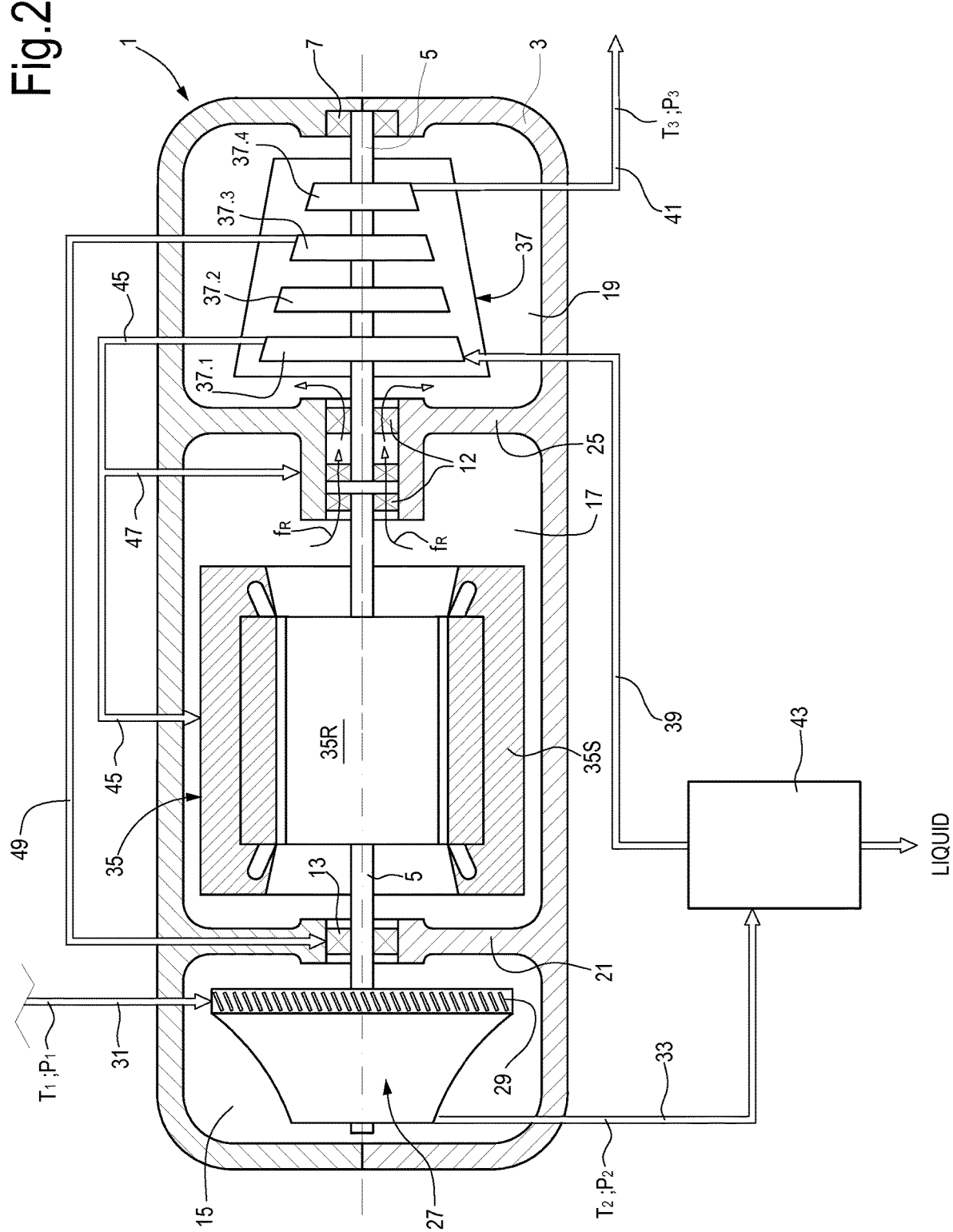
FIG. 2 illustrates a schematic of a second embodiment.

FIG. 2 illustrates a further embodiment of an expander and motor-compressor unit according to the present disclosure. The same reference numbers designate the same or equivalent components as already described with reference to FIG. 1. According to the embodiment of FIG. 2 the central shaft 5 is supported by three bearings only, rather than four, and is devoid of a joint 6. Two radial bearings 7 and 13 are provided near the ends of the shaft, while a combined radial and axial bearing arrangement 12 is provided in a central position, e.g. at the partition wall 25. The partition wall 23 can be dispensed with.

Figure 3:
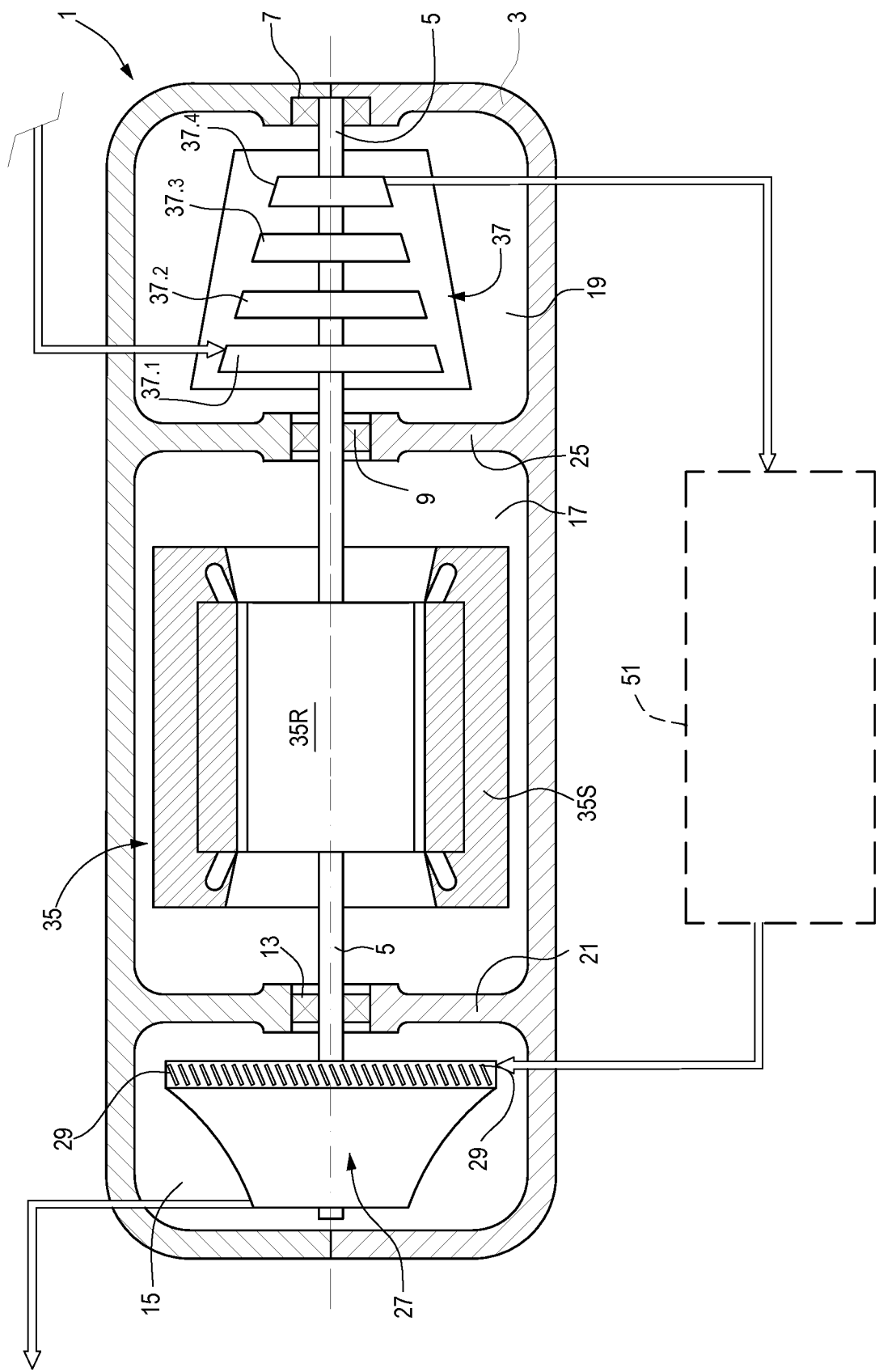
FIGS. 3 to 6 illustrate further embodiments and arrangements of an expander and motor-compressor unit according to the present disclosure.

In the embodiments of FIGS. 1 and 2 the expander and motor-compressor 1 is configured for chilling a gas for dew point control or for removing certain heavier components therefrom. However, in general other embodiments a different gas treatment can be performed between the turbo-expander 27 and the compressor 37. FIG. 3 illustrates a more general configuration of this kind, where functional block 51 represents a generic gas treatment process. In FIG. 3, moreover, the flow direction of the gas has been reversed: the gas flows through the compressor 37 first, and then through the turbo-expander 27. An opposite flow direction, as shown in FIGS. 1 and 2, can be used also in the arrangement of FIG. 3, however.

Figure 4:
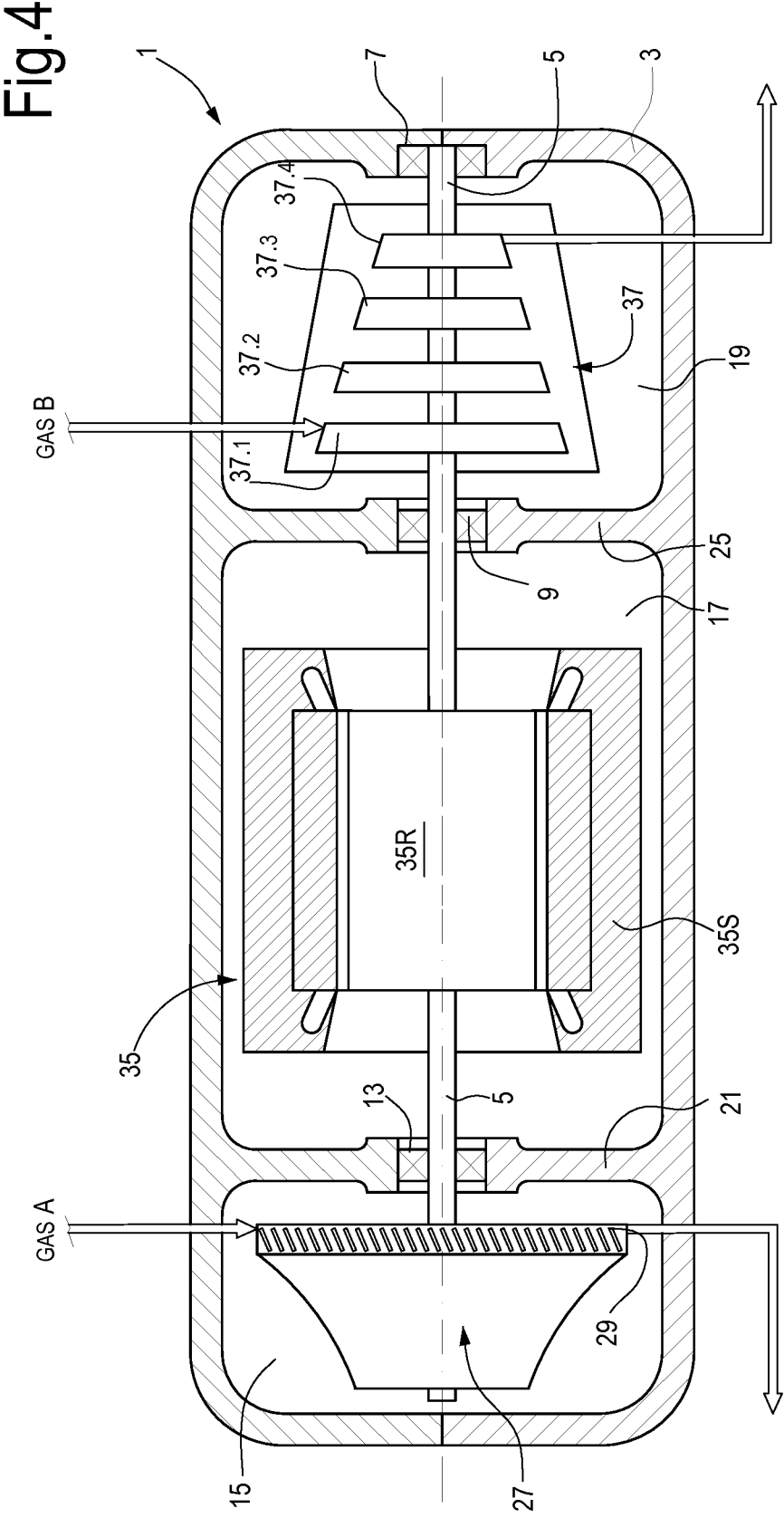

While FIGS. 1 to 3 mainly concern an open circuit where the same gas is processed through the two turbomachines 27, 37, the possibility is not excluded of processing two different gas streams, e.g. two gases A and B which may have a different composition, through the two turbomachines 27 and 37, as schematically shown in FIG. 4.

Figure 5:
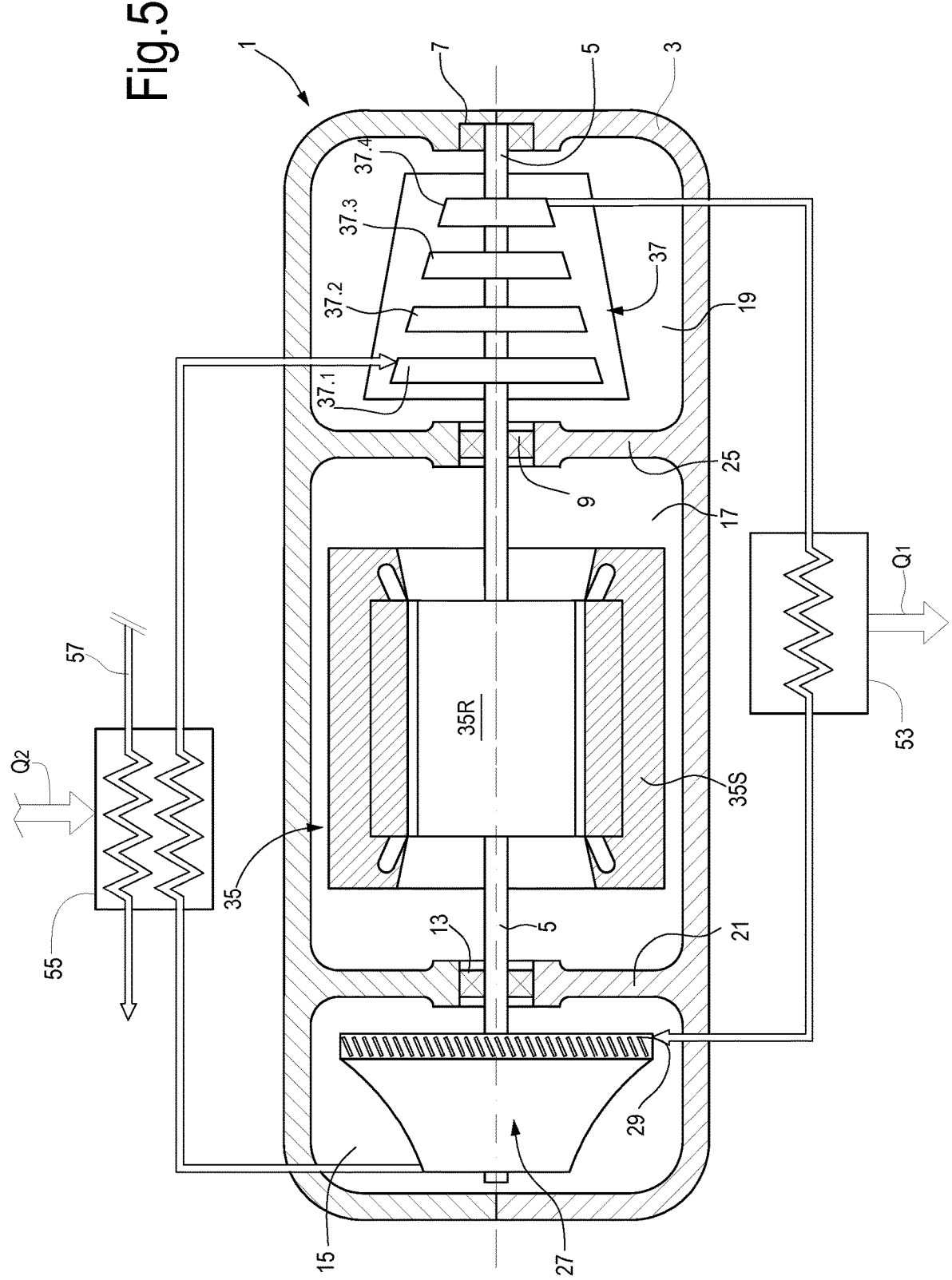

In yet further embodiments, the turbo-expander 27 and the compressor 37 can be arranged in a closed cycle, e.g. in a refrigeration cycle, such as a natural gas liquefaction system. FIG. 5 schematically illustrates an arrangement wherein the delivery side of the compressor 37 is fluidly coupled to the inlet side of the turbo-expander 27 and the discharge side of the turbo-expander is fluidly coupled to the suction side of the compressor. Heat exchange arrangements 53 and 55 are provided between compressor delivery side and turbo-expander inlet, as well as between the turbo-expander discharge and the compressor suction side. The first heat exchange arrangement 53 removes heat from the compressed gas which is then further chilled by expansion in the turbo-expander 27. The cold gas flows then in heat-exchange relationship in the heat exchanger arrangement 57, for instance to remove heat from natural gas flowing in pipeline 57, to promote liquefaction thereof. The schematic of FIG. 4 shall be understood as being a conceptual representation of possible more complex arrangements, using a larger number of machine components, for natural gas liquefaction or other processes where a refrigerant requires to be processed in a closed or semi-closed cycle.

Figure 6:
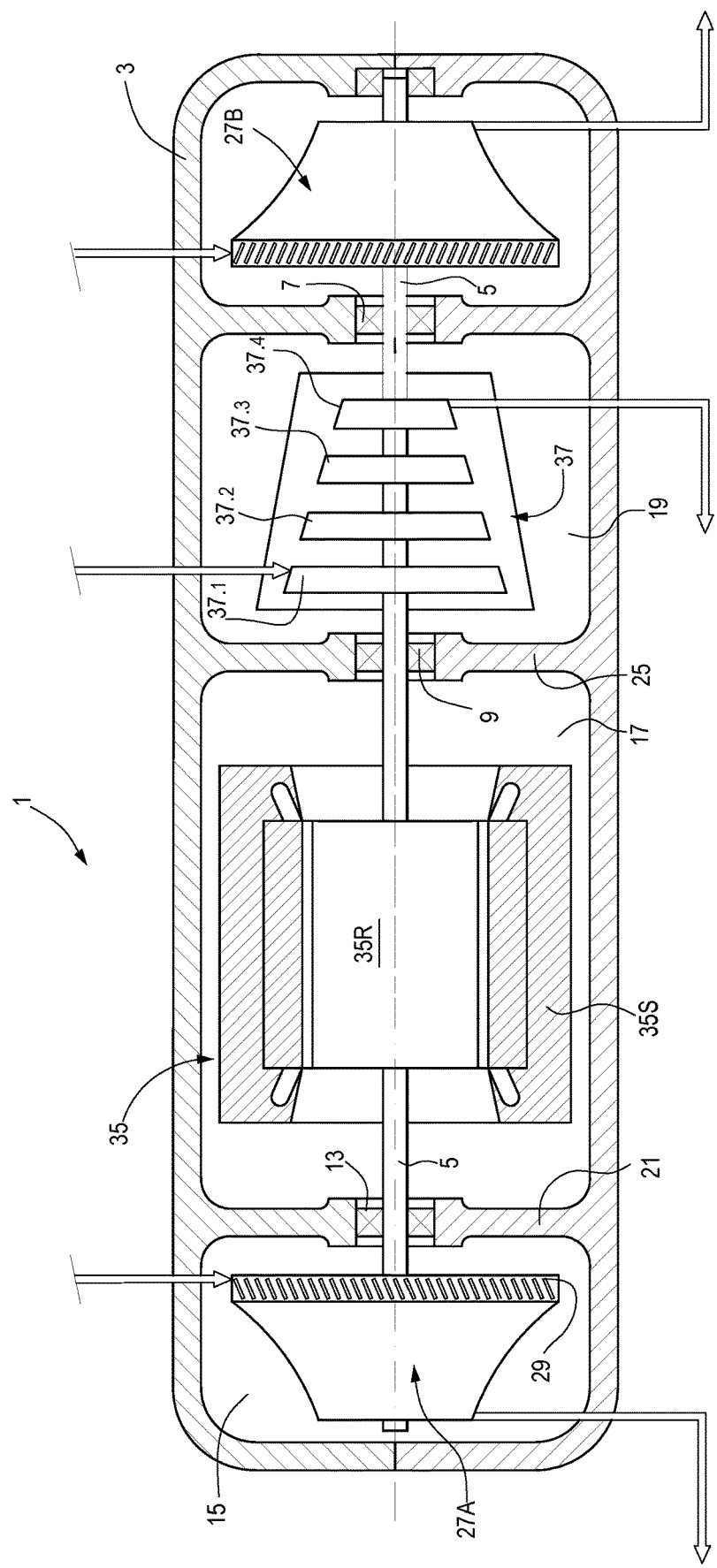

A different number of turbo-expanders can be arranged for rotation in casing 3, if required. For instance, some natural gas liquefaction cycles using nitrogen as a refrigerant may use two expanders. These latter can be configured as parts of an integrated expander and motor-compressor unit as described herein. FIG. 6 illustrates a possible arrangement of two turbo-expanders 27A, 27B in the same casing 3. In the embodiment of FIG. 6 the two turbo-expanders 27A, 27B are mounted cantileverly at opposite ends of the shaft 5. This, however, is not mandatory. In other embodiments the two turbo-expanders 27A, 27B could be arranged on the same side of the shaft, or one at the end of shaft 5 and the other in an intermediate position.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. For instance, while in the illustrated embodiments the electric motor 35 is arranged in a central position, between the turbo-expander 27 (or 27A) and the compressor 37, in other embodiments the compressor 37 can be arranged intermediate the turbo-expander 27 (or 27A) and the motor 35.

Hence, the proper scope of the disclosed innovations should be determined only by the broadest interpretation of the appended claims so as to encompass all such modifications, changes, and omissions. In addition, the order or sequence of any process or method may be varied or re-sequenced according to alternative embodiments.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An expander and motor-compressor unit comprising:
   casing comprising a first compartment, a second compartment and a third compartment, the first and second compartments separated by a first partitional wall and the second and third compartments separated by a second portion wall;
   an electric motor arranged in the second compartment;
   a multi-stage compressor drivingly coupled to the electric motor through a central shaft and arranged in the third compartment, the compressor having a suction side and a delivery side;
   a turbo-expander arranged for rotation in the first compartment and drivingly coupled to the electric motor and to the compressor through the central shaft, the turbo-expander having an inlet side and a discharge side;
   at least two radial bearings to support the central shaft comprising a first radial bearing positioned in the first partition wall and a second radial bearing positioned in the second partition wall;
   a first heat exchanger fluidly coupled to the delivery side of the compressor in the third compartment and the inlet side of the turbo-expander in the first compartment, and a second heat exchanger fluidly coupled to the discharge side of the turbo-expander in the first compartment and the suction side of the compressor in the third compartment, wherein the first heat exchanger is configured to remove heat from compressed gas flowing from the third compartment to the first compartment which is further chilled by expansion in the turbo-expander in the first compartment to produce a cold gas, the produced cold gas is then configured to flow from the first compartment through the second heat exchanger to cool natural gas flowing in a pipeline through the second heat exchanger to promote liquification of the natural gas, and gas exiting the second heat exchanger is configured to flow back to the third compartment for compression.

2. The expander and motor-compressor unit of claim 1, wherein the turbo-expander and the compressor are fluidly coupled such that gas expanded through the turbo-expander is delivered to the compressor and compressed thereby.

3. The expander and motor-compressor unit of claim 1, wherein the turbo-expander is positioned in an overhung configuration on the central shaft.

4. The expander and motor-compressor unit of claim 1, wherein the electric motor is arranged between the turbo-expander and the compressor.

5. The expander and motor-compressor unit of claim 1, wherein the second casing compartment is protected against contaminated gas from the first casing compartment by compressed buffer gas supplied by the compressor.

6. The expander and motor-compressor unit of claim 1, further comprising a gas path configured and arranged to deliver process gas from the compressor to the electric motor to cool the electric motor.

7. The expander and motor-compressor unit of claim 6, wherein a gas return path from the electric motor to the compressor is provided between the electric motor and the compressor, configured and arranged to return process gas from the electric motor to the compressor.

8. The expander and motor-compressor unit of claim 1, wherein at least one of the at least two bearings having a radial supporting capability of the central shaft has also an axial supporting capability.

9. The expander and motor-compressor unit of claim 1, further comprising at least a first gas path to supply gas processed by the compressor from the compressor to at least one of the at least two radial bearings to cool the at least one of the at least two radial bearings, at least one of the at least two radial bearings being a magnetic bearing.

10. The expander and motor-compressor unit of claim 9, further comprising a second gas path fluidly coupled to at least one magnetic bearing arranged between the electric motor and the turbo-expander, the second gas path configured and arranged to deliver a gas for cooling and buffering between the electric motor and the turbo-expander,
   wherein the first gas path is fluidly coupled to the at least one magnetic, the first gas path is in fluid communication with a first compressor stage and the second gas path is in fluid communication with a second compressor stage, downstream of the first compressor stage, such that the gas in the second gas path has a pressure higher than the gas in the first gas path.

11. The expander and motor-compressor unit of claim 1, wherein the turbo-expander comprises variable inlet guide vanes.

12. The expander and motor-compressor unit of claim 1, further comprising a second turbo-expander arranged for rotation in the casing and drivingly coupled to the electric motor and to the compressor through the central shaft.

13. The expander and motor-compressor unit of claim 1, wherein the multi-stage compressor is supported in-between two of the at least two radial bearings.

14. The expander and motor-compressor unit of claim 1, further comprising a first gas path extending from a stage of the multistage compressor and defining a first branch to deliver gas processed by the compressor to cool at least one radial bearing of the at least two radial bearings, and a second branch to deliver gas processed by the compressor to cool the electric motor; and second gas path extending from a different compressor stage to deliver gas processed by the compressor to cool at least one other radial bearing of the at least three radial bearings.

15. The expander and motor-compressor unit of claim 14, wherein at least one of the radial bearings cooled by gas processed by the compressor is a magnetic bearing.

\* \* \* \* \*